United States Patent [19]
Colban

[11] Patent Number: 5,760,989
[45] Date of Patent: Jun. 2, 1998

[54] METHOD AND APPARATUS FOR CAPTIVE CLOCK HEAD ASSEMBLY

[75] Inventor: Dan Colban, San Leandro, Calif.

[73] Assignee: Phase Metrics, San Diego, Calif.

[21] Appl. No.: 632,011

[22] Filed: Apr. 15, 1996

[51] Int. Cl.[6] .................................................. G11B 33/14
[52] U.S. Cl. ........................ 360/75; 360/97.02; 360/105
[58] Field of Search ........................ 360/69, 75, 97.01, 360/97.02, 104, 105

[56] References Cited

U.S. PATENT DOCUMENTS

| | | | |
|---|---|---|---|
| 4,920,442 | 4/1990 | Dimmick | 360/97.01 X |
| 4,980,783 | 12/1990 | Moir et al. | 360/75 X |
| 5,465,182 | 11/1995 | Ishikawa | 360/75 |
| 5,617,267 | 4/1997 | Kawagoe et al. | 360/75 X |
| 5,668,679 | 9/1997 | Swearingen et al. | 360/75 |

Primary Examiner—Aristotelis M. Psitos
Assistant Examiner—James L. Habermehl
Attorney, Agent, or Firm—Blakely Sokoloff Taylor & Zafman

[57] ABSTRACT

The present invention is a clock head assembly that writes reference marks on a magnetic disk of a hard drive. The clock head assembly includes a clock head that is mounted to an arm and coupled to the magnetic disk through a window of the disk drive housing. The arm is pivotally mounted to a housing which has a gasket that seals the window and allows the assembly to operate in a non-clean room environment. The arm is coupled to a cam that is manually actuated by a lever to move the clock head arm assembly between a loaded position and an unloaded position. An alignment plate is also provided for aligning the clock head assembly to the hard drive assembly.

10 Claims, 7 Drawing Sheets

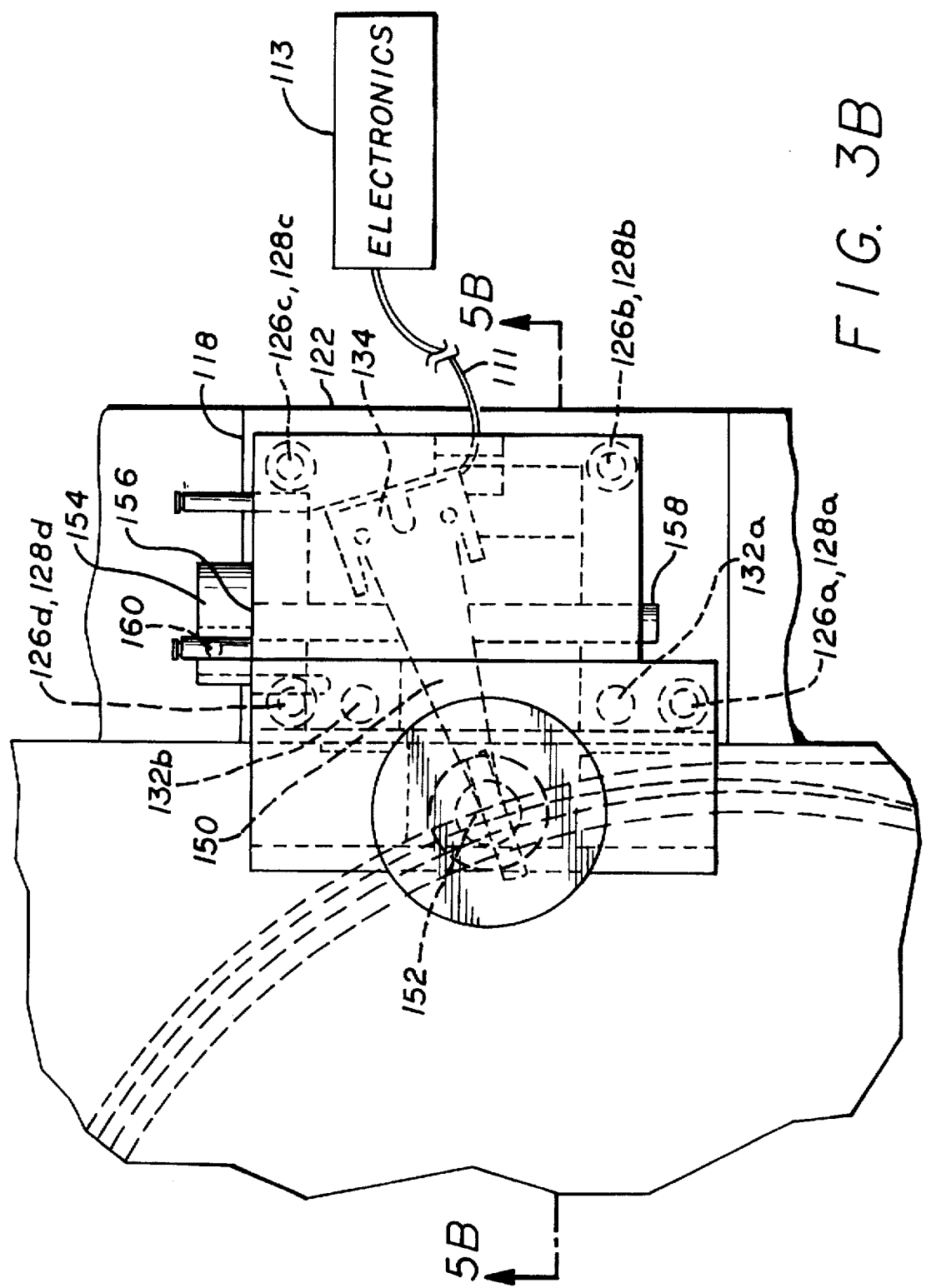

METHOD AND APPARATUS FOR CAPTIVE CLOCK HEAD ASSEMBLY

BACKGROUND OF THE INVENTION

1. Field of the Invention

The present invention relates in general to hard disk drives, and more particularly, to a method and apparatus of providing a portable, captive clock head which can be secured to a hard disk drive so as to provide reference signals during servo writing.

2. Description of the Related Art

Disk drives are magnetic recording devices used for the storage of digital information. The digital information is recorded on concentric tracks on either surface of one or more magnetic recording disks. Each concentric track is divided into one or more sectors in which data is recorded.

In such magnetic recording devices, "marks" are used in establishing a reference point from which informational data may be detected. These marks include address marks which indicate the start of a sector in which digital data is recorded and synchronization pulses which facilitate synchronism between the internal clock of the disk drive and the speed at which the recording disk rotates.

Typically, before any information is recorded on the disks, sectors are established, to facilitate the orderly recording and reproduction of information. Prior to establishing these sectors, reference marks are written on the outermost track of the recording disks to provide reference points for the initial formatting of the disks. This is typically accomplished using a clock head assembly which is mounted on an assembly station.

FIG. 1 illustrates a conventional servo-track writing system 10, which positions the read/write heads in a magnetic disk drive 12 from a master drive assembly 14 located on an assembly station 16. The servo-track writing system 10 includes a master drive assembly 14 which includes a master arm 18 that is controlled by a master arm motor 20. The master arm 18 controls the movement of the hard drive arm 22 through the use of a mechanical push-pin 24.

To provide positional information of the read/write heads during servo writing, a master clock head assembly 26 located on the assembly station 16 embeds reference marks in the form of index bits on the outermost track of the disk. After writing the index bits, the master clock head assembly 26 verifies the validity of the index bits. During servo writing, the index bits are read by the master clock head assembly 26 and provided to a microprocessor-based servo controller 28. The servo controller 28 generates reference signals used in controlling the read/write heads mounted on the hard drive arm 22 via electronics 30.

The cover of the hard drive assembly 12 is removed prior to and during the process of servo writing so that the master arm 18 and the master clock head assembly 26 can be coupled to the hard drive arm 22 and the disk surface, respectively. This is typically accomplished in an open room environment. To ensure that dust or other contamination on the disk surface is minimized, the process of writing the reference marks and the process of servo writing must be conducted in a clean room, which is adequately equipped with filters to minimize contamination. In addition, personnel conducting the servo writing process must be fitted with appropriate clothing such as gowns, hoods and gloves to minimize the risk of contaminating the disks. Furthermore, the reference mark writing process and the servo writing process are restricted to the assembly station 16 since the master clock head assembly 26 is mounted on the assembly station 16. Such typical servo writing processes are thus particularly cumbersome and expensive.

Accordingly, there is a need in the technology for providing an apparatus and method for writing reference marks which is not restricted to an assembly station and which eliminates the need to utilize a clean room environment.

BRIEF SUMMARY OF THE INVENTION

The present invention is a clock head assembly that writes reference marks on a magnetic disk of a hard drive. The clock head assembly includes a clock head that is mounted to an arm and coupled to the magnetic disk through a window of the disk drive housing. The arm is pivotally mounted to a housing which has a gasket that seals the window and allows the assembly to operate in a non-clean room environment. The arm is coupled to a cam that is manually actuated by a lever to move the clock head arm assembly between a loaded position and an unloaded position. An alignment plate is also provided for aligning the clock head assembly to the hard drive assembly.

BRIEF DESCRIPTION OF THE DRAWINGS

FIG. 3B is an enlarged top view of the captive clock head assembly taken along line 3B—3B of FIG. 3A.

DETAILED DESCRIPTION OF THE INVENTION

Figure 1:
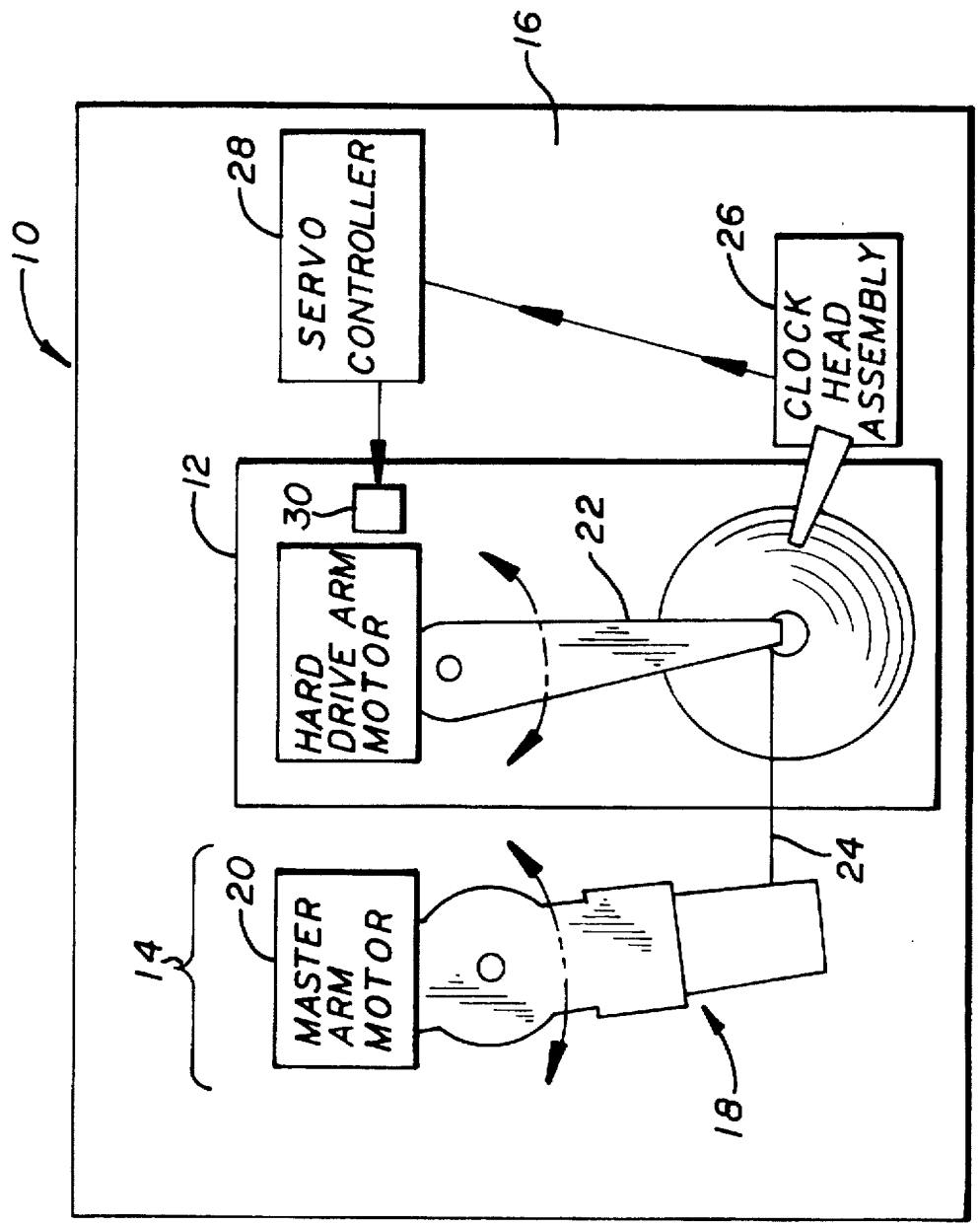
FIG. 1 is a schematic diagram of a disk drive assembly station of the prior art.
Figure 2:
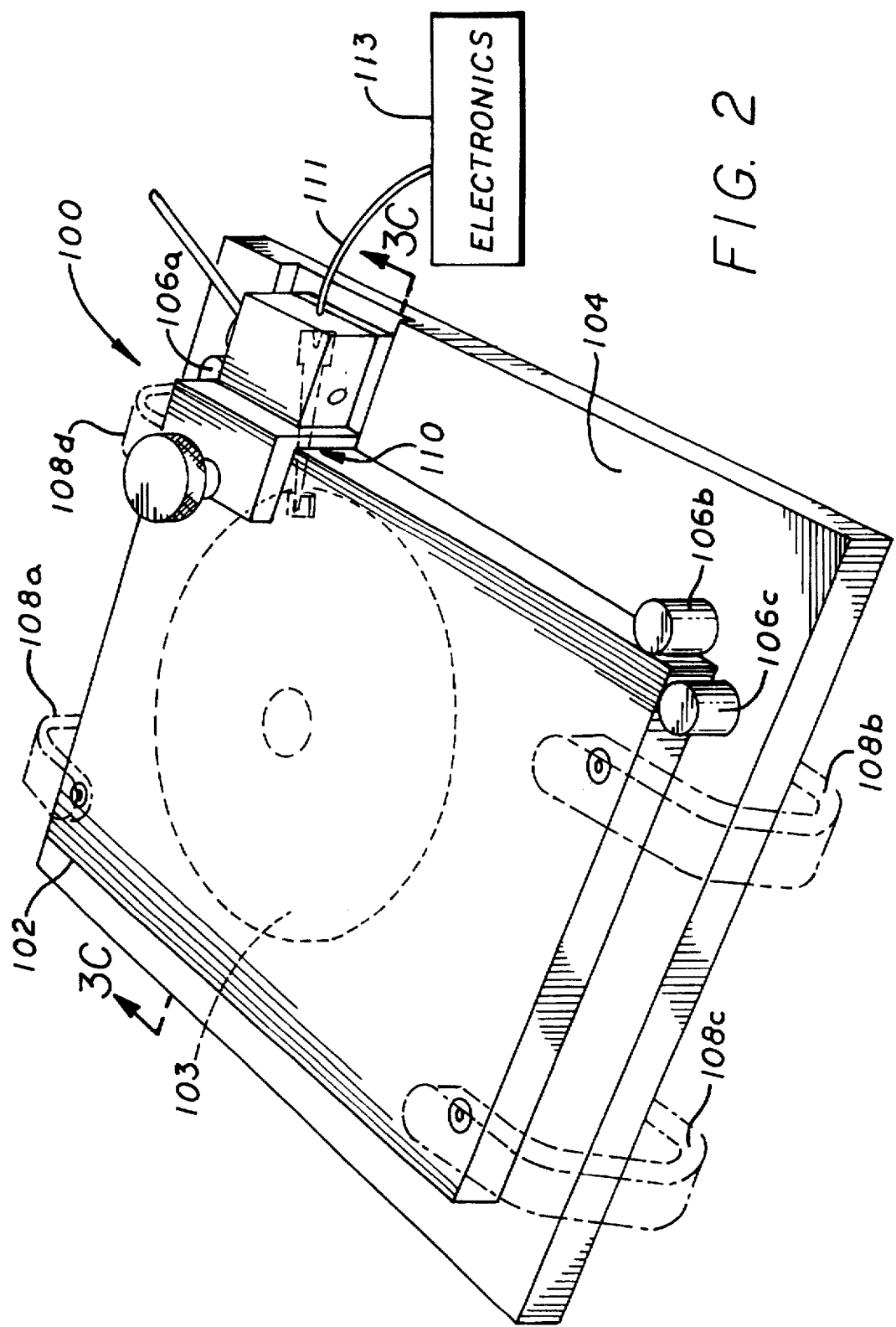
FIG. 2 is a perspective view of the captive clock head assembly of the present invention, shown attached to a hard disk drive.

With reference to the drawings, FIG. 2 is a perspective view of the captive clock head assembly 100 of the present invention, shown attached to a hard disk drive 102 which has at least one magnetic date storage disk 103. Attachment of the captive clock head assembly 100 to the hard disk drive 102 is conducted under a clean hood (not shown). The hard disk drive 102 is first positioned on an alignment plate 104. A plurality of tooling pins 106a–106c located on the alignment plate 104 facilitate the alignment of the hard disk drive 102 onto the alignment plate 104. Once aligned, the hard disk drive 102 is clamped onto the alignment plate 104 by means of clamps 108a–d. A clock head (not shown) of the captive clock head assembly 100 is inserted into the hard disk drive 102 through an opening 110 located on the side of the hard disk drive 102. The captive clock head assembly 100 is then fastened onto the hard disk drive 102. Reading and writing of reference marks in the form of index bits by the clock head is performed under the control of an electronics assembly 113, which is coupled to the clock head via signal line 111.

Figure 3A:
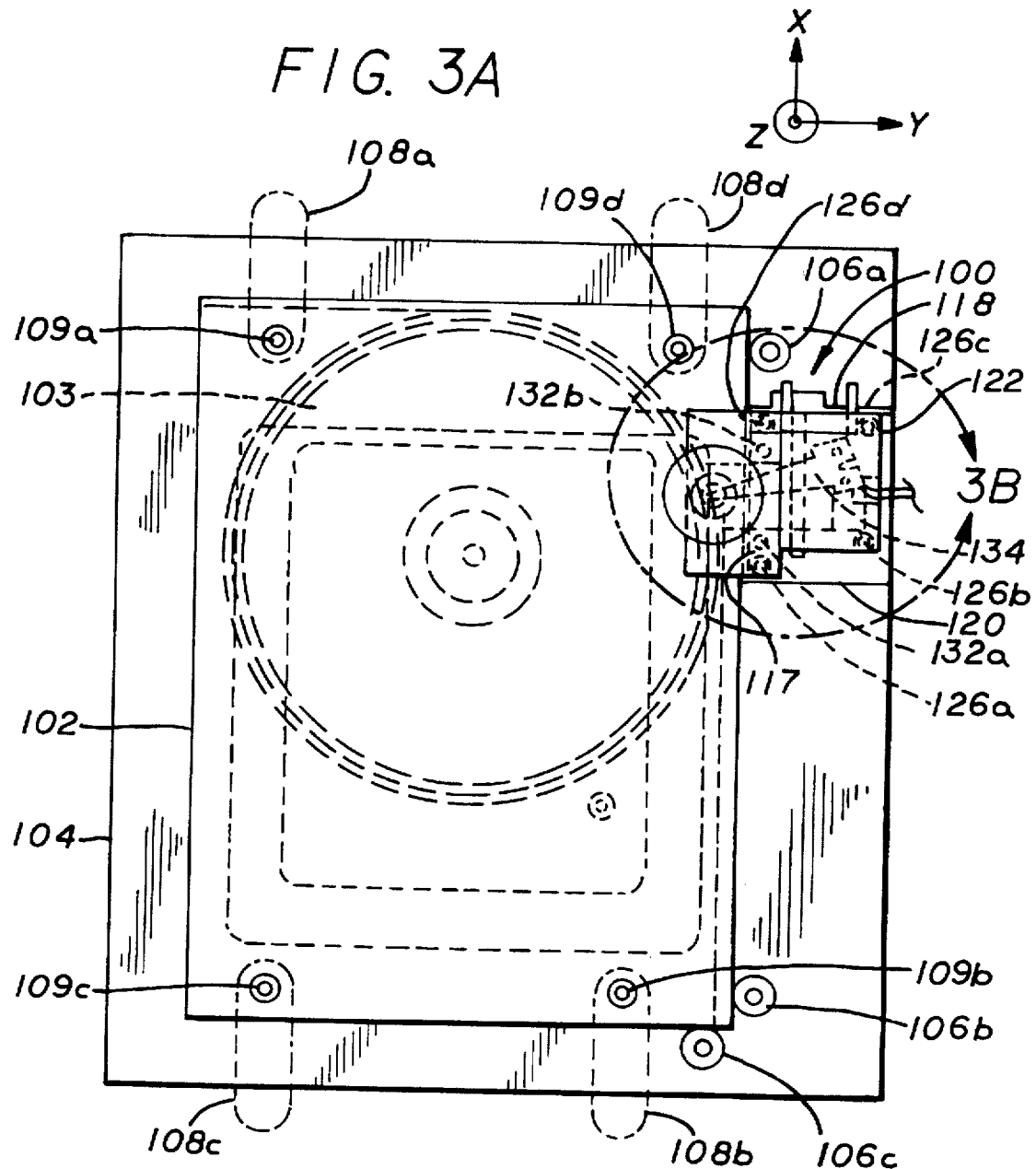
FIG. 3A is a top view of the captive clock head assembly of FIG. 2.
Figure 3C:
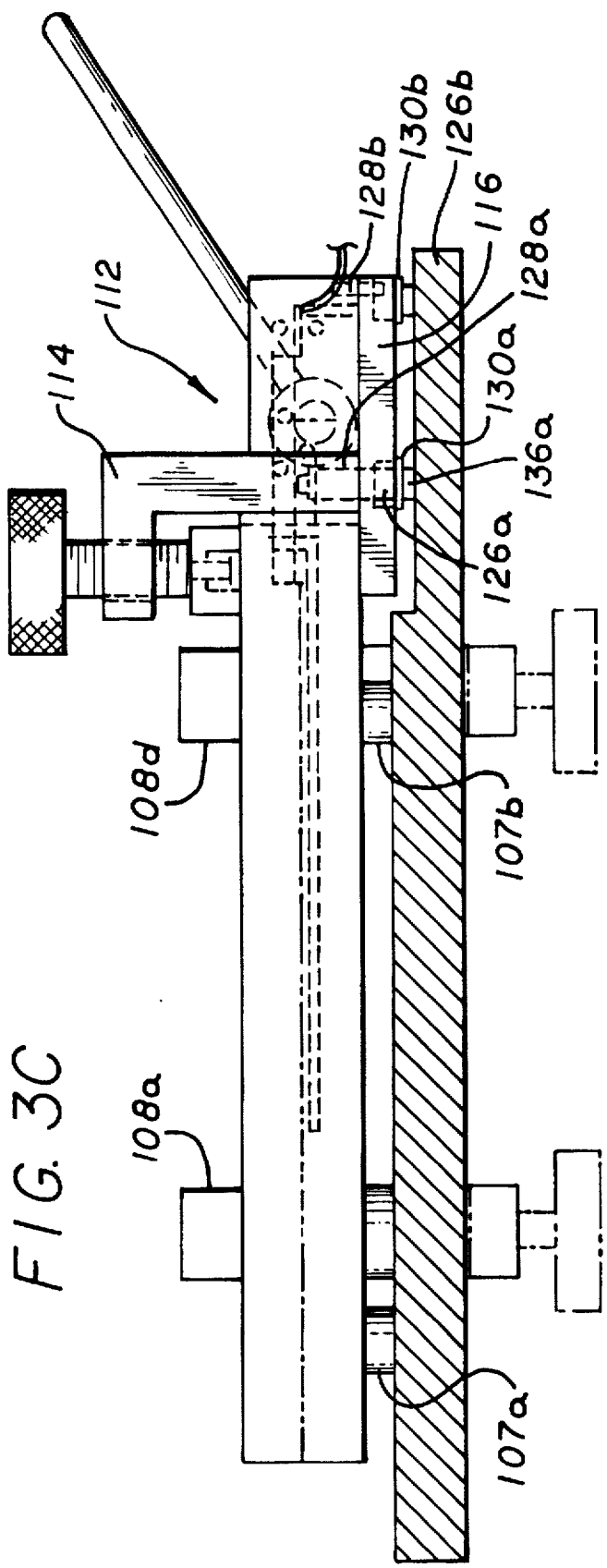
FIG. 3C is a side view of the captive clock head assembly taken along line 3C—3C of FIG. 2.

As shown in FIGS. 3A–3C, the captive clock head assembly 100 comprises a housing 112 (see FIG. 3C) which includes a cover 114 and a bottom plate 116. The cover 114 comprises a top plate 117, two side walls 118, 120 and a back wall 122 (see FIG. 3A). The cover 114 is attached to the bottom plate 116 by a plurality of screws 130a–d. Located on the bottom plate 116 are two alignment holes 132a and 132b (see FIG. 3B), used for aligning the captive clock head assembly 100 to the alignment plate 104. Mounted onto the inner wall of the cover 114 is a clock head arm assembly 134.

With reference to FIG. 3A, the alignment plate 104 is a flat plate which includes three tooling pins 106a–106c. Tooling pins 106a and 106b provide a datum axis in the Y-direction, while tooling pin 106c provides a reference axis in the X direction. In an alternate embodiment, the housing 112 may have a datum surface(s) which cooperates with a feature of the hard disk drive 102 to provide alignment for the housing 112 with respected to the hard disk drive 102. In addition, two alignment pins 136a and 136b (136a is shown in FIG. 3C) located on the alignment plate 104 are used to align the captive clock head assembly 100 to the alignment plate 104. The alignment plate 104 also includes a number of tooling pads 107a–107d (107a–b are shown in FIG. 3C) that support the hard disk drive 102.

To attach the captive clock head assembly 100 to the hard disk drive 102, the hard disk drive 102 is first positioned on the alignment plate 104, and placed against the tooling pins 106a–106c. When positioned, clamps 108a–d positioned on tooling points 109a–109d located on the housing of the hard disk drive 102. Once the disk drive 102 is positioned, the clock head arm assembly 134 mounted on the captive clock head assembly 100 is inserted through the opening 110 (see FIG. 2) of the hard disk drive assembly 102. The captive clock head assembly 100 is then positioned on the alignment plate 102 by aligning the alignment pins 136a and 136b with the alignment holes 132a and 132b located on the bottom plate 124 of the captive clock head assembly 100. Once aligned, the captive clock head assembly 100 is seated on the alignment plate 102.

Figure 4:
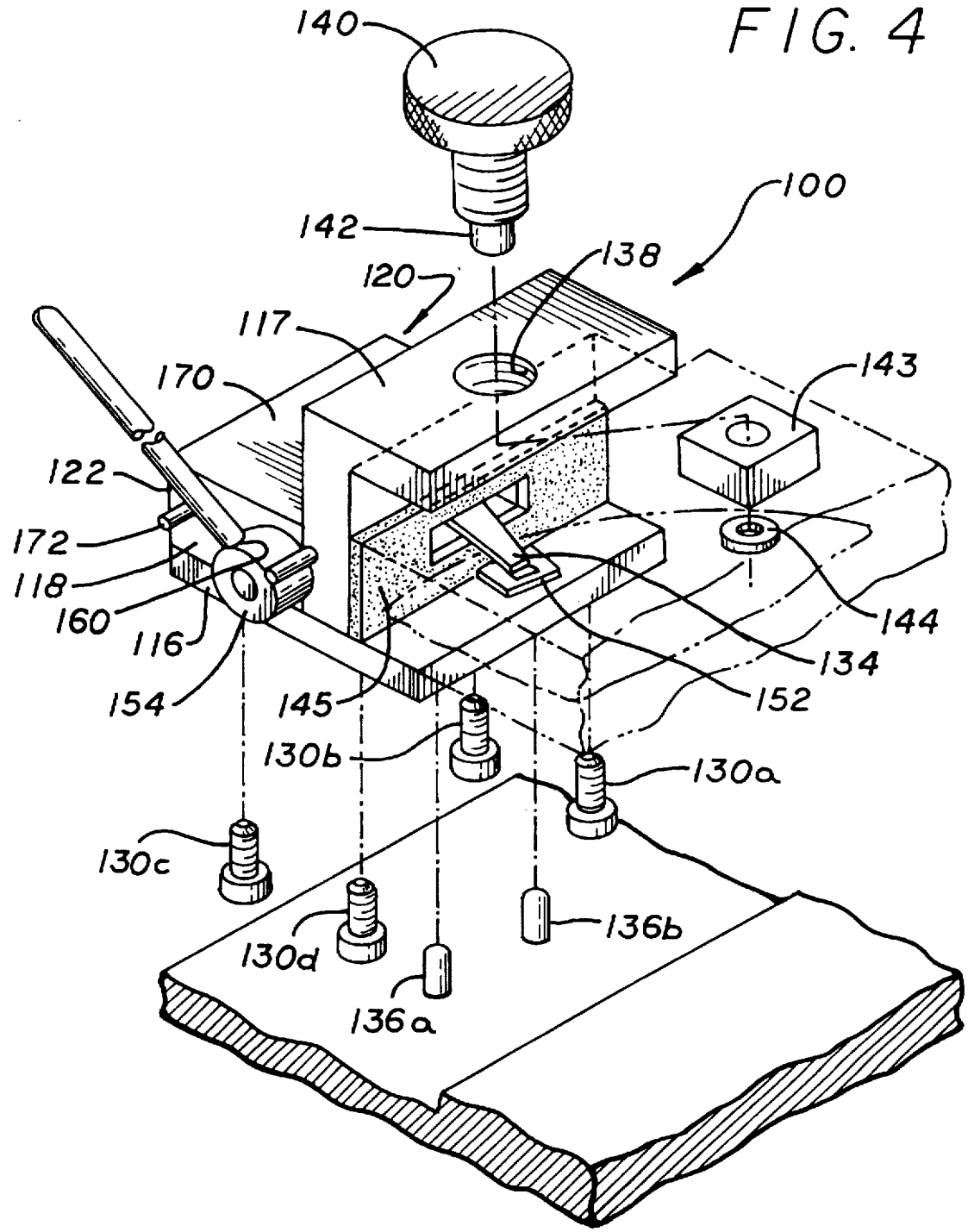
FIG. 4 is an exploded view of the captive clock head assembly of the present invention.

Referring to FIGS. 3c and 4, the top plate 117 of the captive clock head assembly 100 has a threaded aperture 138 which receives a thumb screw 140. The thumb screw 140 includes a tip 142 which fits into a pad 143. The pad 143 is captured by a nut member 144. When the captive clock head assembly 100 is positioned against the hard disk drive 102 and also seated on the alignment plate 102, the captive clock head assembly 100 is held in position in the Z-direction by the thumb screw 140 and pad 143 arrangement.

The captive clock head assembly 100 also includes a gasket 145 which provides a tight seal between the captive clock head assembly and the hard disk drive 102 when the captive clock head assembly 100 is mounted against the hard disk drive 102. Once positioned, the captive clock head assembly 100 is secured against the hard disk drive 102, and both the clock head arm assembly 134 and the hard disk drive 102 are sealed from the environment. The captive clock head assembly 100, together with the hard disk drive 102, may then be removed from the alignment plate 104 and the clean hood under which the alignment and assembly processes have been conducted, for the process of servo writing. An example of the method and apparatus of servo writing is described in co-pending U.S. patent application entitled "Method And Apparatus For Non-Contact Servo Writing" filed on Apr. 15, 1996, which is assigned to the assignee of the present invention. The method and apparatus described in the co-pending U.S. patent application may also be conducted in a non-clean room environment.

Next, the captive clock head assembly 134 which is mounted on the inner wall of the cover 114 may be loaded onto the disk 103 located in the hard disk drive 102 so that index bits may be written on the disk 103. The clock head arm assembly 134 is pivotally mounted on the inside surface of the top plate 117 of the cover 122 and comprises a flexure arm 150 and a clock head 152. The flexure arm 150 rests on a cam 154 mounted through apertures 156 and 158 (see FIG. 3B) located on the side walls 118 and 120 of the cover 114, respectively. Located on the cam 154 is a mounting hole 160 (see FIG. 5A), which receives a lever arm 162. The cam 154 further includes a pin 164 which is connected to one end of a spring 166. The other end of the spring 166 is connected to another pin 168 mounted on the side wall 118. Also located on the side wall 118 are two position pins 170 and 172 for restricting movement of the lever arm 162.

Figure 5A:
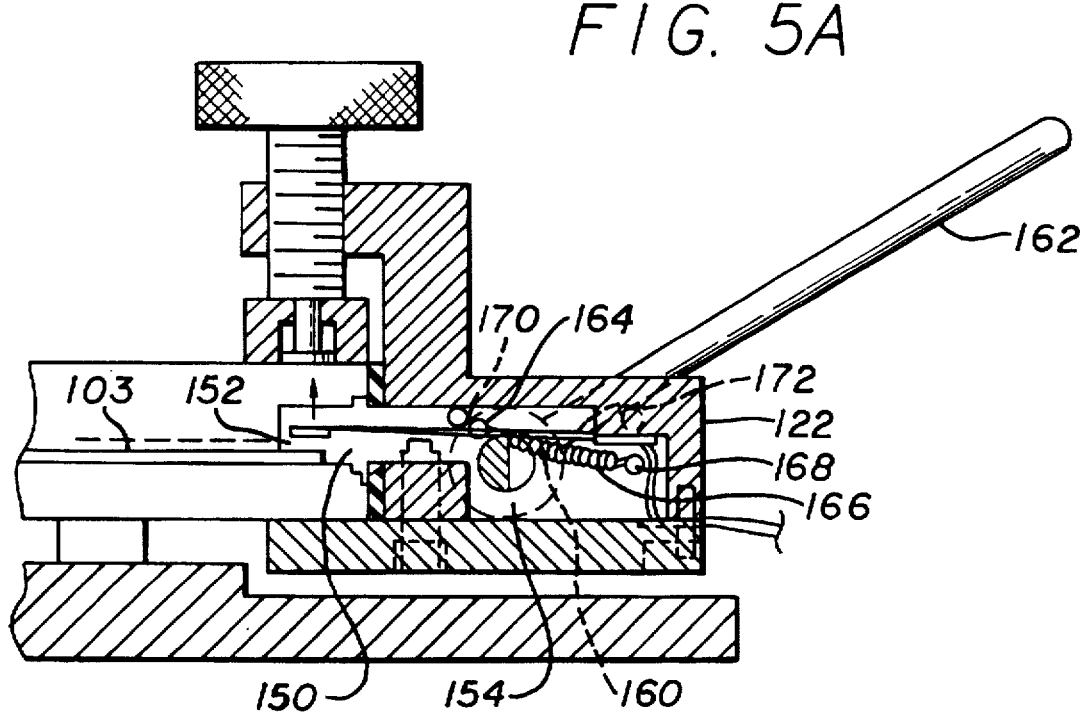
FIG. 5A is a side view of the captive clock head assembly shown with its lever arm in an unloaded position.
Figure 5B:
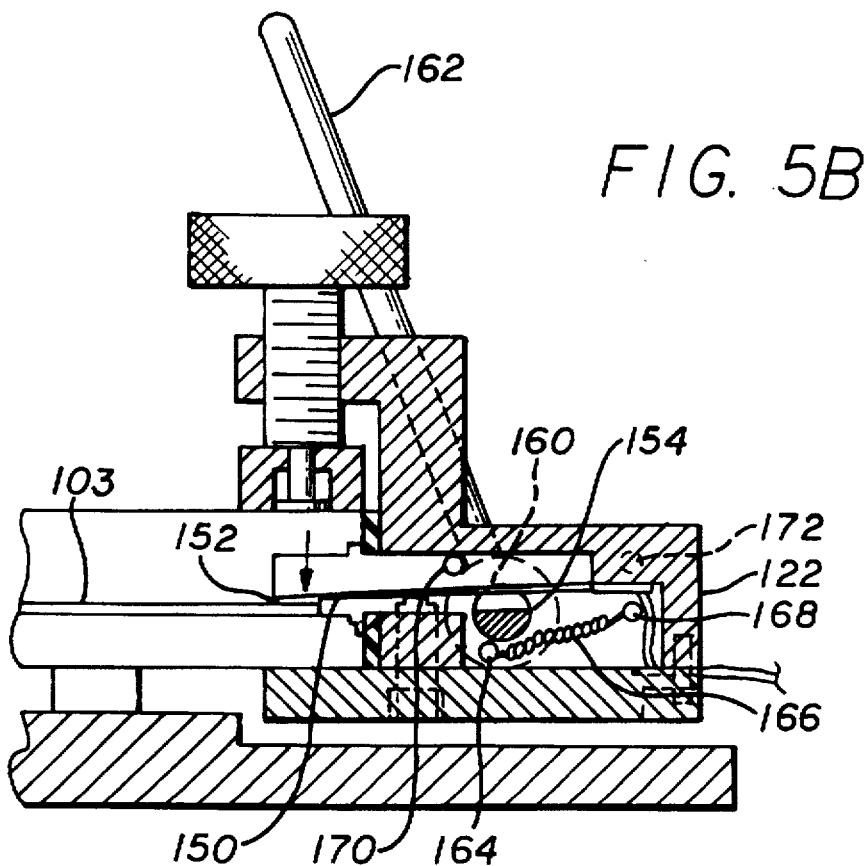
FIG. 5B is a side view of the captive clock head assembly shown with its lever arm in a loaded position.

Once inserted in the mounting hole 160, the lever arm 162 may be rotated from a first position to a second position, thereby lifting the clock head 152 of the clock head arm assembly 134 from an unloaded to a loaded position. When the lever arm 162 is rotated backwards, as shown in FIG. 5A, it reaches a first position where it rests against the position pin 172. In this first position, the lever arm 162 is held in place by the tension in the spring 166. In addition, the head 152 of the clock head assembly 134 is unloaded, i.e., lifted to a position above the surface of the disk 103 by the cylindrical portion 156 of the cam 154. When the lever arm 162 is rotated forwards, as shown in FIG. 5B, it reaches a second position where it rests against the position pin 170. In this position, the lever arm 162 is also held in place by the tension in the spring 166. When the lever arm 162 is rotated to the second position, the clock head 152 is loaded onto the surface of the disk 103, as shown in FIG. 5B.

When the clock head 152 is loaded onto the disk 103, writing of the index bits on the disk 103 may begin. When the writing of the index bits is completed, the clock head 152 reads and verifies the index bits written on the disk 103. When thus verified, servo writing may begin. When the servo writing process is completed, the captive clock head assembly 100 may be removed from the hard disk drive 102 under a clean hood. Upon removal of the captive clock head assembly 100, the opening 110 on the hard disk drive 102 is sealed by with a piece of tape.

By using the captive clock head assembly of the present invention, a clock head arm assembly can be secured to a hard disk drive under a clean hood during the assembly process, thus eliminating the need to utilize a clean room environment for the reference mark writing process, and also eliminating the need for the reference mark writing process to be restricted to an assembly station.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

Applicant claims:

1. A clock head assembly for writing clock signals on a disk of a hard disk drive which has an opening, the clock head assembly comprising:

a housing;

a clock head that is mounted to said housing and loaded onto the disk through the opening of the hard disk drive; and a gasket that is attached to said housing and pressed against the hard disk drive to seal the opening on the hard disk drive when said clock head is loaded onto the disk.

2. The assembly of claim 1, further comprising a lever that is attached to a cam, said cam being coupled to said clock head so that said clock head moves from a first position to a second position when said lever is rotated.

3. The assembly of claim 1, wherein the housing further comprises a clamp that is coupled to said housing and which secures the clock head assembly to the hard disk drive.

4. The assembly of claim 1, further comprising an alignment plate having a plurality of alignment pins that align said housing to the hard disk drive.

5. The assembly of claim 1, further comprising a circuit coupled to the clock head for controlling reading and writing of reference marks by the clock head.

6. A method for writing clock signals on a disk of a hard disk drive which has an opening, comprising the steps of:

(a) providing a clock head mounted to a housing which has a gasket such that said gasket is pressed against the hard disk drive to seal the opening; and (b) inserting the clock head through the opening.

7. The method of claim 6, further comprising the step of securing the housing to the hard drive assembly.

8. The method of claim 6, further the steps of:

moving the clock head an unloaded position to a loaded position.

9. The method of claim 6, further comprising the step of aligning said housing of the hard disk drive with an alignment plate.

10. The method of claim 6, further comprising the steps of:

(a) writing clock signals on the disk;

(b) writing servo signals on the disk with reference to the clock signals;

(e) removing said clock head from the hard disk drive; and (f) sealing the opening of the hard disk drive.

* * * * *